United States Patent
Sugimoto et al.

(10) Patent No.: US 8,421,284 B2
(45) Date of Patent: Apr. 16, 2013

(54) COOLING STRUCTURE FOR STATOR

(75) Inventors: Masatoshi Sugimoto, Nishio (JP); Koji Kato, Anjo (JP); Tsuyoshi Miyaji, Toyohashi (JP)

(73) Assignee: Aisin AW Co., Ltd., Anjo (JP)

(*) Notice: Subject to any disclaimer, the term of this patent is extended or adjusted under 35 U.S.C. 154(b) by 352 days.

(21) Appl. No.: 12/983,959

(22) Filed: Jan. 4, 2011

(65) Prior Publication Data

US 2011/0180239 A1  Jul. 28, 2011

(30) Foreign Application Priority Data

Jan. 28, 2010  (JP) ................................. 2010-017273

(51) Int. Cl.
*H02K 9/19*  (2006.01)

(52) U.S. Cl.
USPC .............................................. 310/54; 310/58

(58) Field of Classification Search ................ 310/52–5, 310/58–59
See application file for complete search history.

(56) References Cited

U.S. PATENT DOCUMENTS

| 5,929,543 A * | 7/1999 | Zeyen et al. ..................... 310/54 |
| 6,815,848 B1 * | 11/2004 | Glew .............................. 310/52 |
| 7,545,060 B2 * | 6/2009 | Ward .............................. 310/54 |
| 2007/0176499 A1 * | 8/2007 | Holmes et al. ................... 310/54 |
| 2010/0176668 A1 * | 7/2010 | Murakami et al. ............... 310/54 |
| 2010/0244594 A1 * | 9/2010 | Murakami et al. ............... 310/54 |
| 2010/0277016 A1 * | 11/2010 | Dang et al. ...................... 310/54 |

FOREIGN PATENT DOCUMENTS

| JP | A-2004-180376 | 6/2004 |
| JP | A-2005-229672 | 8/2005 |
| JP | A-2006-6047 | 1/2006 |
| JP | A-2007-20334 | 1/2007 |

OTHER PUBLICATIONS

Mar. 1, 2011 International Search Report issued in International Patent Application No. PCT/JP2010/072112 (with translation).

* cited by examiner

*Primary Examiner* — Tran Nguyen

(74) *Attorney, Agent, or Firm* — Oliff & Berridge, PLC

(57) ABSTRACT

A cooling structure for a stator configured with a cooling medium distributing member formed with a plurality of discharge openings, and a distributing path, wherein the distributing path has a plurality of chambers separated by a partition wall, and an inter-chamber communication passage that is formed in the partition wall and communicates between the adjacent chambers. The cooling medium distributing member includes at least one cooling medium distributing chamber that divides the distributing path to a plurality of inter-chamber communication passages, and also includes a plurality of discharge chambers. The plurality of inter-chamber communication passages formed in the partition wall are formed with a ratio of an opening width between the different inter-chamber communication passages set according to a ratio of a sum of opening cross-sectional areas of all of the cooling medium discharge openings which are located downstream of each of the inter-chamber communication passages.

20 Claims, 6 Drawing Sheets

F I G . 1
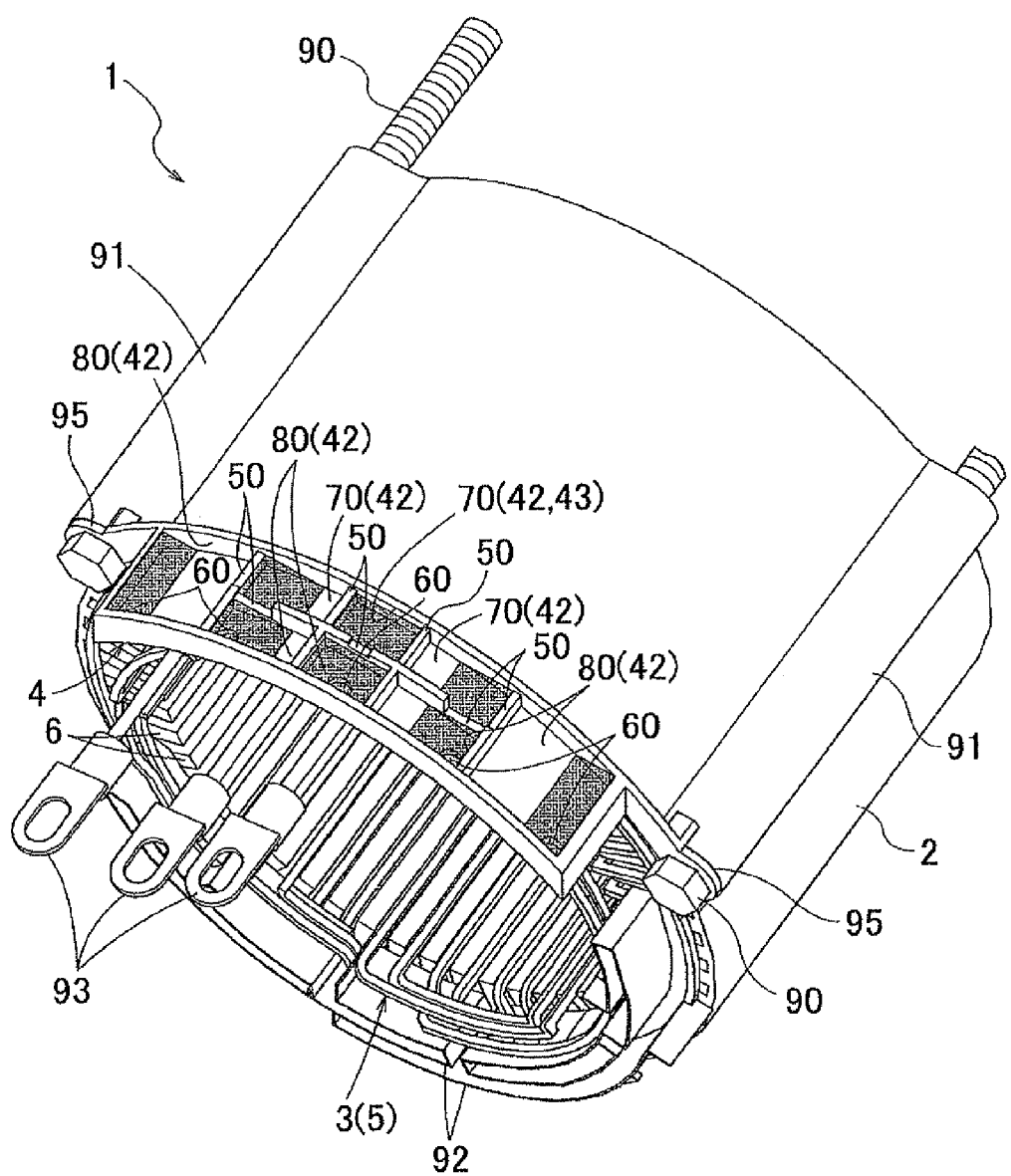

COOLING STRUCTURE FOR STATOR

INCORPORATION BY REFERENCE

The disclosure of Japanese Patent Application No. 2010-017273 filed on Jan. 28, 2010 including the specification, drawings and abstract is incorporated herein by reference in its entirety.

BACKGROUND OF THE INVENTION

The present invention relates to a cooling structure for a stator of a rotating electrical machine that supplies a cooling medium to a coil end portion of the stator including a stator core and the coil end portion protruding from an end in the axial direction of the stator core, so as to cool the coil end portion.

DESCRIPTION OF THE RELATED ART

An example of the cooling structure for the stator in related art is a technique described in, e.g., Japanese Patent Application Publication No. JP-A-2004-180376 (FIGS. 2 and 3 and the like) below. In the structure disclosed in Japanese Patent Application Publication No. JP-A-2004-180376, as shown in FIGS. 2 and 3 and the like of Japanese Patent Application Publication No. JP-A-2004-180376, a gutter 28, which has a plurality of coolant supply ports 36 formed in a bottom plate 28b and has both ends as open ends 28e, is placed along an outer periphery 24e of a coil end portion 24. A cooling medium (a coolant) supplied to the gutter 28 is discharged from the coolant supply ports 36 and the open ends 28e (hereinafter collectively referred to as the "cooling medium discharge openings") toward the coil end portion 24 to cool the coil end portion 24.

SUMMARY OF THE INVENTION

In order to efficiently cool the coil end portion, it is desirable that the cooling medium supplied to the gutter 28 be distributed to the plurality of cooling medium discharge openings at a desired distribution ratio. In the structure described in Japanese Patent Application Publication No, JP-A-2004-480376, however, the plurality of coolant supply ports 36 are merely formed along a path in which the cooling medium flows down from a top position 28t to the open ends 28e of the gutter 28. Thus, it is not easy to distribute the cooling medium at the desired distribution ratio. Moreover, the cooling medium may not reach the ends, depending on the amount of cooling medium that is supplied to the gutter 28.

Thus, it is desired to implement a cooling structure for a stator, which is capable of distributing the cooling medium to the plurality of cooling medium discharge openings at the desired distribution ratio, regardless of the amount of cooling medium that is supplied.

A cooling structure according to a first aspect of the present invention for a stator of a rotating electrical machine that supplies a cooling medium to a coil end portion of the stator including a stator core and the coil end portion protruding from an end in an axial direction of the stator core, so as to cool the coil end portion, is characterized by including: a cooling medium distributing member provided above a region of the coil end portion to which the cooling medium is to be supplied, the cooling medium distributing member being formed with a plurality of cooling medium discharge openings for supplying the cooling medium to the coil end portion, and a cooling medium distributing path for distributing the introduced cooling medium to the plurality of cooling medium discharge openings. In the cooling structure for the stator, the cooling medium distributing path has a plurality of chambers separated by a partition wall, and an inter-chamber communication passage that is formed in the partition wall and communicates between the adjacent chambers. As the plurality of chambers, the cooling medium distributing member includes at least one cooling medium distributing chamber that divides the cooling medium distributing path by distributing the cooling medium introduced into the chamber to a plurality of the inter-chamber communication passages, and also includes a plurality of cooling medium discharge chambers having the cooling medium discharge openings formed therein. The cooling medium distributing path is formed so as not to merge after being divided by the cooling medium distributing chamber. Regarding the plurality of the inter-chamber communication passages that are formed in the partition wall surrounding the one cooling medium distributing chamber and communicate with the different chambers located on a downstream side, bottom surface portions of the inter-chamber communication passages are located at the same level, and a ratio of an opening width between the different inter-chamber communication passages is set according to a ratio of a sum of opening cross-sectional areas of all of the cooling medium discharge openings which are located downstream of each of the inter-chamber communication passages.

According to the first aspect, the cooling medium distributing chamber for dividing the cooling medium distributing path is formed as a chamber separated by the partition wall. The cooling medium introduced into the cooling medium distributing chamber is distributed to the plurality of chambers located on the downstream side, through the plurality of the inter-chamber communication passages that are formed in the partition wall surrounding the cooling medium distributing chamber. The cooling medium distributing path is formed so as not to merge after being divided by the cooling medium distributing chamber. The plurality of the inter-chamber communication passages, which are formed in the partition wall surrounding the one cooling medium distributing chamber and communicate with the plurality of different chambers located on the downstream side, are formed so that their bottom surface portions are located at the same level. Thus, the cooling medium introduced into the cooling medium distributing chamber is distributed to the plurality of chambers located on the downstream side, at a distribution ratio that is determined according to the opening widths of the plurality of the inter-chamber communication passages. In the case where the chamber located on the downstream side is the cooling medium distributing chamber, the cooling medium introduced into the cooling medium distributing chamber is further distributed to the plurality of chambers located on the downstream side thereof in a similar manner. Eventually, the cooling medium is distributed to each of the plurality of cooling medium discharge chambers having the cooling medium discharge openings formed therein, at a distribution ratio according to the opening widths of all of the inter-chamber communication passages which are located upstream of each cooling medium discharge chamber. Thus, by appropriately setting the opening width of each inter-chamber communication passage, the cooling medium can be distributed to the plurality of cooling medium discharge openings at a desired distribution ratio.

According to the above characteristic structure, regarding the plurality of the inter-chamber communication passages that are formed in the partition wall surrounding the one cooling medium distributing chamber and communicate with the different chambers located on the downstream side, the ratio of the opening width between the different inter-chamber communication passages is set according to the ratio of the sum of the opening cross-sectional areas of all of the cooling medium discharge openings which are located downstream of each of the inter-chamber communication passages. Thus, the amount of cooling medium according to the sum of the opening cross-sectional areas of all the cooling medium discharge openings formed in each cooling medium discharge chamber is supplied to each of the plurality of cooling medium discharge chambers. This enables the amount of cooling medium according to the opening cross-sectional area of each cooling medium discharge opening to be supplied to each of the plurality of cooling medium discharge openings, regardless of the amount of cooling member that is supplied to the cooling medium distributing chamber.

The plurality of chambers may be formed in a vessel shape that opens upward, and each of the inter-chamber communication passages be formed by cutting out a part of an upper portion of the partition wall.

According to this structure, the cooling medium can be introduced into the cooling medium distributing member from above, whereby the structure for supplying the cooling medium to the cooling medium distributing member can be simplified. Moreover, since the inter-chamber communication passages have a cutout shape, the process of forming the inter-chamber communication passages having a desired opening width can be simplified, and the manufacturing cost of the cooling medium distributing member can be reduced.

The coil end portion may be formed in a cylindrical shape so that a central axis extends in a direction that crosses a vertical direction, the cooling medium distributing member be formed in a circular arc shape as viewed in an axial direction of the coil end portion, and be placed along an outer peripheral surface of the coil end portion, and a cooling medium introducing chamber, which is the cooling medium distributing chamber into which the cooling medium is introduced from outside of the cooling medium distributing member, be located in an uppermost part in the cooling medium distributing member.

According to this structure, since the cooling medium introducing chamber is a chamber that is located in the uppermost part in the cooling medium distributing member, the cooling medium distributing path from the cooling medium introducing chamber toward each cooling medium discharge chamber can be formed so as not to have a portion that guides the cooling medium to flow upward. Thus, it becomes easy to flow the cooling medium down along the cooling medium distributing path by using the gravity, even if a pump or the like is not provided. This can simplify the structure of the cooling medium distributing member. Moreover, since the cooling medium distributing member is placed along the outer peripheral surface of the coil end portion, the cooling medium distributing member can be placed by using a gap between the outer peripheral surface of the coil end portion and the case. Thus, the cooling structure for the stator according to the present invention can be implemented by placing the cooling medium distributing member even in a limited space.

In the structure in which the coil end portion is formed in a cylindrical shape so that the central axis extends in the direction that crosses the vertical direction, and the cooling medium distributing member is formed in a circular arc shape as viewed in the axial direction of the coil end portion and is placed along the outer peripheral surface of the coil end portion, as described above, the cooling medium distributing member may include a plurality of the cooling medium distributing chambers, and have a portion in which a cooling medium distributing chamber portion and a cooling medium discharge chamber portion are arranged side by side in the axial direction of the coil end portion, the cooling medium distributing chamber portion being a portion in which the plurality of the cooling medium distributing chambers are arranged adjacent to each other along a circumferential direction of the coil end portion, and the cooling medium discharge chamber portion being a portion in which the plurality of cooling medium discharge chambers are arranged adjacent to each other along the circumferential direction of the coil end portion.

According to this structure, since the cooling medium distributing chambers and the cooling medium discharge chambers are arranged regularly, the cooling medium distributing path can be simplified, and an increase in size of the cooling medium distributing member can be reduced. Moreover, since the cooling medium discharge chambers are arranged along the circumferential direction of the coil end portion, the cooling medium can be supplied to a wide area of the coil end portion in the circumferential direction.

The cooling medium distributing member may be formed so as to cover at least an uppermost part of the coil end portion.

According to this structure, the cooling medium can be supplied to the uppermost part of the coil end portion and the vicinity thereof. Moreover, the cooling medium can be relatively easily supplied to the entire coil end portion by using the gravity. Thus, the coil end portion can be cooled appropriately.

A groove-like recessed portion may be formed around an opening portion of the cooling medium discharge opening in a lower surface of the cooling medium distributing member.

According to this structure, the possibility is reduced that the cooling medium that is discharged downward from the cooling medium discharge openings may flow along the lower surface of the cooling medium distributing member. Thus, the cooling medium that is discharged from the cooling medium discharge openings can be more reliably supplied to the region of the coil end portion which is located below the cooling medium discharge opening and to which the cooling medium is to be supplied, whereby the coil end portion can be cooled appropriately. Note that providing such a groove-like recessed portion does not increase the size of the cooling medium distributing member in the up/down direction, and thus causes no significant problem regarding the positioning of the cooling medium distributing member.

Each of the opening cross-sectional areas of the plurality of the cooling medium discharge openings may be set according to an amount of heat that is generated in a corresponding part of the region of the coil end portion to which the cooling medium is to be supplied.

According to this structure; a larger amount of cooling medium can be supplied to a hotter region of the coil end portion, whereby cooling efficiency of the coil end portion can be increased.

Regarding the plurality of the inter-chamber communication passages that are formed in the partition wall surrounding the one cooling medium distributing chamber and communicate with the different chambers located on the downstream side, the ratio of the opening width between the different inter-chamber communication passages may be set equal to the ratio of the sum of the opening cross-sectional areas of all of the cooling medium discharge openings which are located downstream of each of the inter-chamber communication passages.

According to this structure, the cooling medium can be appropriately supplied from each cooling medium distributing chamber to each of the cooling medium discharge openings, according to the amount of cooling medium that can be discharged from each cooling medium discharge opening located downstream of the cooling medium discharging chamber. The ratio of the discharge amount of the cooling medium between the different cooling medium discharge openings is substantially equal to the ratio of the opening cross-sectional area between the different cooling medium discharge openings. Thus, the coil end portion can be cooled efficiently.

BRIEF DESCRIPTION OF THE DRAWINGS

FIG. 1 is a perspective view of a stator according to an embodiment of the present invention;

DETAILED DESCRIPTION OF THE EMBODIMENTS

Figure 2:
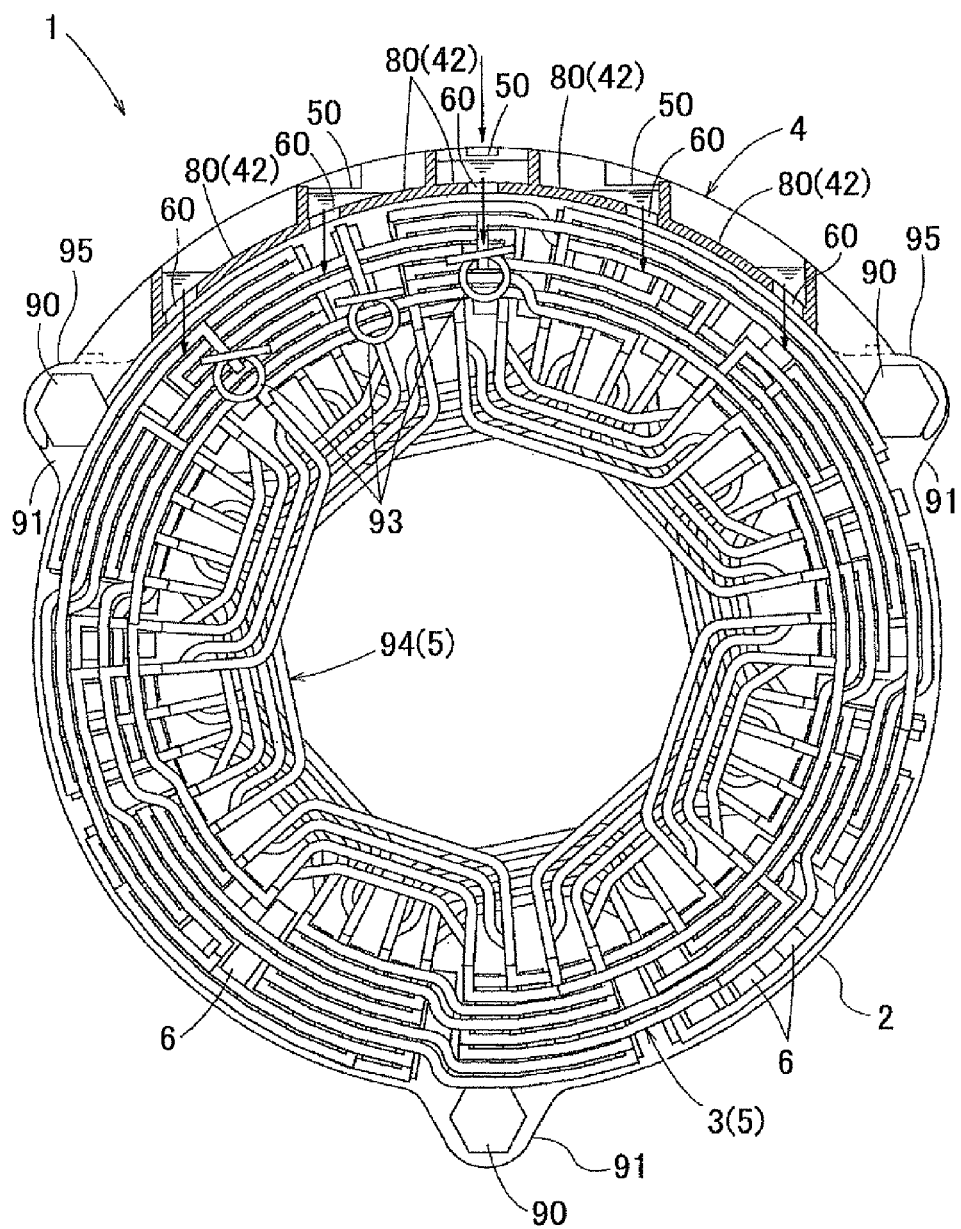
FIG. 2 is a diagram showing the stator according to the embodiment of the present invention as viewed from one side in the axial direction.

An embodiment of a cooling structure for a stator according to the present invention will be described with reference to the accompanying drawings. The embodiment will be described with respect to an example in which the present invention is applied to a stator that is placed in a case so that the central axis of the stator extends in a horizontal direction (which is an example of a direction that crosses a vertical direction). The cooling structure for the stator according to the present embodiment is characterized by including a cooling medium distributing member 4 as shown in FIG. 1 in order to appropriately supply a cooling medium to a coil end portion 3 included in the stator 1, and is especially characterized by a method for setting the opening widths of inter-chamber communication passages 50 that are formed in the cooling medium distributing member 4. Providing such a cooling medium distributing member 4 enables the cooling medium to be distributed at a desired distribution ratio to a plurality of cooling medium discharge openings 60 formed in the cooling medium distributing member 4, regardless of the amount of cooling medium that is supplied to the cooling medium distributing member 4. The cooling structure for the stator of the present embodiment will be described in detail below in order of "Structure of Stator," "Structure of Cooling Medium Distributing Member," and "Method for Setting Opening Widths of Inter-Chamber Communication Passages."

Note that in the following description, the "axial direction," the "circumferential direction," and the "radial direction" are defined based on the central axis of the stator 1 (a rotating electrical machine) unless otherwise specified. In the following description, "one side in the one axial direction" indicates the lower left side along the axial direction in FIG. 1 (the side closer to the viewer in FIG. 2), and the "other side in the axial direction" indicates the upper right side along the axial direction in FIG. 1 (the side away from the viewer in FIG. 2), unless otherwise specified.

Moreover, in the following description, "upper" indicates the upper side in the vertical direction in the state in which the stator 1 is used, and "lower" indicates the lower side in the vertical direction in the state in which the stator 1 is used. Note that the up/down direction in FIG. 2 matches the up/down direction (the vertical direction) in the state in which the stator 1 is used. For example, in the case where the stator 1 is a stator for a rotating electrical machine as a driving force source of a vehicle such as a hybrid vehicle or an electric vehicle, the state in which the stator 1 is mounted on the vehicle corresponds to the state in which the stator 1 is used.

1. Structure of Stator

The structure of the stator 1 according to the present embodiment will be described with reference to FIGS. 1 and 2. Note that FIG. 2 is a diagram of the stator 1 of FIG. 1 as viewed from the one side in the axial direction (the lower left side along the axial direction in FIG. 1). However, in order to facilitate understanding of the structure of the cooling medium distributing member 4, FIG. 2 shows the cooling medium distributing member 4 in cross section taken along the radial direction (a direction perpendicular to the central axis) at the positions where the cooling medium discharge openings 60 are formed.

As shown in FIG. 1, the stator 1 includes a stator core 2 and the coil end portion 3, and is structured as an armature for the rotating electrical machine. Note that as used herein, the term "rotating electrical machine" is used as a concept including a motor (an electric motor), a generator (an electric generator), and a motor-generator that functions both as a motor and a generator as needed. The stator core 2 includes a cylindrical core main body portion, and ridge portions 91 formed on the outer peripheral surface of the core main body portion so as to protrude radially outward, and has a cylindrical overall shape. Note that the ridge portions 91 are formed along the entire length of the stator core 2 in the axial direction, and are formed at positions that equally divide the circumference of the core main body portion into three parts (see FIG. 2). The stator core 2 is fixedly fastened to a case (not shown) by fastening bolts 90 that are inserted through insertion holes formed in the ridge portions 91. At this time, the stator 1 is fixed to the case so that the central axis of the stator 1 matches the horizontal direction.

A plurality of teeth 6 are formed radially inside the stator core 2 at predetermined intervals along the circumferential direction, and slots extending in the axial direction and the radial direction are formed between the teeth 6 that are located adjacent to each other in the circumferential direction. The plurality of slots formed along the circumferential direction have the same cross-sectional shape, have a predetermined width and a predetermined depth, and open inward in the radial direction. A coil end portion that protrudes from an end in the axial direction of the stator core 2 is formed by coils 5 wound in the respective slots. In this example, the coil end portion is formed on both sides in the axial direction of the stator core 2. In the following description, as shown in FIGS. 1 and 2, reference character "3" represents the coil end portion on the one side in the axial direction, and reference character "94" represents the coil end portion on the other side in the axial direction. In the present embodiment, the coil end portion 3 on the one side in the axial direction is a coil end portion to be cooled by the cooling medium distributing member 4. As shown in FIGS. 1 and 2, the coil end portion 3 is formed in a cylindrical shape so that the central axis of the coil end portion 3 extends in a direction (in this example, the horizontal direction) that crosses the vertical direction. Note that the coil end portion 94 on the other side in the axial direction is not shown in FIG. 1.

In the present embodiment, the stator 1 is a stator for use in a rotating electrical machine that is driven by a three-phase alternating current, and the coils 5 is formed by a three-phase structure (U-phase, V-phase, and W-phase). In this example, the coils 5 are linear conductors having a rectangular cross section taken along a plane perpendicular to the direction in which the coils 5 extend. Three terminals 93 are provided corresponding to the coils 5 of the three phases, and a magnetic field can be generated by applying a current to the coils 5 through the three terminals 93. Note that in order to ensure an electrical insulation property between the coils 5 of different phases, inter-phase insulation sheets 92 are placed in the coil end portion 3.

Although not shown in the drawing, a rotor as a field magnet including a permanent magnet and an electromagnet is positioned radially inside the stator 1 (the stator core 2) so as to be rotatable relative to the stator 1. That is, the stator 1 of the present embodiment is a stator for an inner rotor type and revolving-field type rotating electrical machine. The stator 1 of the present embodiment is structured so that the cooling medium is supplied via the cooling medium distributing member 4 to the coil end portion 3 that generates heat when driving the rotating electrical machine.

Note that such a stator core 2 can be formed as, e.g., a laminated structure in which a plurality of annular electromagnetic steel plates are laminated together, or a member including as a main component a pressed powder material that is formed by pressure forming magnetic powder that is powder of a magnetic material.

2. Structure of Cooling Medium Distributing Member

The structure of the cooling medium distributing member 4 will be described in detail below with reference to FIGS. 1 and 2. Note that a method for setting the opening widths of the inter-chamber communication passages 50 formed in the cooling medium distributing member 4 will be described in Section 3.

As shown in FIGS. 1 and 2, in the present embodiment, the cooling medium distributing member 4 is provided above a region of the coil end portion 3 (the coil end portion on the one side in the axial direction) to which the cooling medium is to be supplied. The "region of the coil end portion 3 to which the cooling medium is to be supplied" means a region of the coil end portion 3 to which the cooling medium is directly supplied from the cooling medium distributing member 4, and in this example, indicates a region including the uppermost part of the coil end portion 3. The cooling medium distributing member 4 is made of an insulating material (e.g., a resin or the like). This enables the cooling medium distributing member 4 to be positioned by effectively using the existing space provided to insulate between the coil end portion 3 and the case. Note that in this example, the cooling medium distributing member 4 is structured to be fixed to the case integrally with the stator core 2 via attachment portions 95.

In the present embodiment, as described above, the coil end portion 3 is formed in a cylindrical shape whose central axis extends in the horizontal direction. As shown in FIG. 2, according to such a shape of the coil end portion 3, the cooling medium distributing member 4 has a circular arc shape as viewed in the axial direction of the coil end portion 3. The cooling medium distributing member 4 is placed along the outer peripheral surface of the coil end portion 3. This reduces an increase in size of the case due to the placement of the cooling medium distributing member 4. Note that the "outer peripheral surface of the coil end portion" is a radially outer peripheral surface (a cylindrical surface) of the cylindrical coil end portion 3, and more specifically, is a surface along a radially outermost part (an end face) of the coils 5 that form the coil end portion 3.

As shown in FIG. 1, the plurality of cooling medium discharge openings 60, which have a circular cross section and supply the cooling medium to the coil end portion 3, are formed in the cooling medium distributing member 4. In this example, five cooling medium discharge openings 60 are formed at the same position in the axial direction, but at different positions from each other in the circumferential direction in the cooling medium distributing member 4. The five cooling medium discharge openings 60 are formed to have the same opening cross-sectional area. Note that as shown in FIG. 2, in this example, those regions of the lower surface of the cooling medium distributing member 4 which are located adjacent to the cooling medium discharge openings 60 have a smooth, circular arc shaped surface.

Each of the cooling medium discharge opening 60 is formed at such a position that the entire opening portion thereof overlaps the coil end portion 3 (to be exact, a cylindrical space that is occupied by the coil end portion 3; the same applies to the description below) as viewed in the vertical direction. In other words, in this example, each of the cooling medium discharge openings 60 is formed so that an end on the one side in the axial direction of the opening portion is located at the same position in the axial direction as that of an end on the one side in the axial direction of the coil end portion 3, or is located on the other side in the axial direction with respect to that position in the axial direction. Note that the direction in which the cooling medium is discharged from the cooling medium discharge openings 60 is affected by the gravity and the surface tension, and is a direction substantially along a vertically downward direction. Thus, forming the cooling medium discharge openings 60 at such positions enables the cooling medium discharged from the cooling medium discharge openings 60 to be efficiently supplied to the coil end portion 3. Note that arrows in FIG. 2 schematically show the flow of the cooling medium that is supplied to the cooling medium distributing member 4, and the cooling medium that is supplied from each cooling medium discharge opening 60 to the coil end portion 3. The cooling medium supplied to the coil end portion 3 cools the coil end portion 3 by heat exchange with the coil end portion 3. Note that various known coolants such as, e.g., oil can be used as the cooling medium.

In order to efficiently cool the coil end portion 3, it is desirable that the cooling medium supplied to the cooling medium distributing member 4 be able to be distributed to each of the plurality of cooling medium discharge openings 60 at the desired distribution ratio. Thus, a cooling medium distributing path for distributing the introduced cooling medium to the plurality of cooling medium discharge openings 60 is formed in the cooling medium distributing member 4. Specifically, as shown in FIG. 1, the cooling medium distributing member 4 includes, as components forming the cooling medium distributing path, a plurality of (eight in this example) chambers 42 separated by partition walls, and inter-chamber communication passages 50 formed in the partition walls and communicating between adjacent ones of the chambers 42. That is, the cooling medium distributing path has the plurality of chambers 42 separated by the partition walls, and the inter-chamber communication passages 50 formed in the partition walls and communicating between adjacent ones of the chambers 42. The locations where the cooling medium distributing path is divided, and the direction in which the cooling medium flows down in the cooling medium distributing path are determined according to the positions where the inter-chamber communication passages 50 are formed, and the relation in level between the bottom surfaces of the different inter-chamber communication passages 50. Providing such a cooling medium distributing path enables the cooling medium to be distributed to each of the plurality of cooling medium discharge openings 60 at the desired distribution ratio, as described below. However, it should be understood that as used herein, the "desired distribution ratio" can be any value as long as the coil end portion 3 can be cooled to such an extent that causes no significant problem in terms of the use of the stator 1, and may have a certain range.

As the plurality of chambers 42, the cooling medium distributing member 4 includes at least one cooling medium distributing chamber 70 for distributing the cooling medium introduced into the chambers to the plurality of inter-chamber communication passages 50 to divide the cooling medium distributing path, and also includes a plurality of cooling medium discharge chambers 80 in which the cooling medium discharge openings 60 are formed. In this example, the cooling medium distributing member 4 includes three cooling medium distributing chambers 70, and five cooling medium discharging chambers 80. Note that as shown also in FIG. 2, in this example, the cooling medium discharge openings 60 are formed in the bottom surfaces (the surfaces facing radially outward) of the cooling medium discharging chambers 80.

In the present embodiment, as shown in FIG. 1, the cooling medium distributing member 4 has a portion in which a cooling medium distributing chamber portion and a cooling medium discharge chamber portion are positioned side by side in the axial direction of the coil end portion 3. The cooling medium distributing chamber portion is a portion in which the plurality of cooling medium distributing chambers 70 are arranged adjacent to each other along the circumferential direction of the coil end portion 3, and the cooling medium discharge chamber portion is a portion in which the plurality of cooling medium discharge chambers 80 are arranged adjacent to each other along the circumferential direction of the coil end portion 3. In this example, the three cooling medium distributing chambers 70 form the cooling medium distributing chamber portion, and the three cooling medium discharge chambers 80 other than the cooling medium discharge chambers 80 located on both sides in the circumferential direction form the cooling medium discharge chamber portion. Regularly arranging the cooling medium distributing chambers 70 and the cooling medium discharge chambers 80 in this manner can simplify the cooling medium distributing path, and can reduce an increase in size of the cooling medium distributing member 4. Moreover, since the cooling medium discharge chambers 80 are arranged along the circumferential direction, the cooling medium is easily supplied to a wide area of the coil end portion 3 in the circumferential direction.

Moreover, in the present embodiment, as shown in FIG. 1, the plurality of chambers 42 are formed in a vessel shape that opens upwards. Since each of the plurality of chambers 42 is surrounded on four sides by the partition walls, this reduces outflow of the cooling medium via a portion other than the inter-chamber communication passages 50 and the cooling medium discharge openings 60. Note that as shown in FIGS. 1 and 2, in each of those chambers 42 whose bottom surfaces (surfaces facing radially outward) have an increased tilt angle with respect to the horizontal direction (in this example, the chambers 42 other than the chambers 42 located in the middle in the circumferential direction), the outflow of the cooling medium via the portion other than the inter-chamber communication passages 50 and the cooling medium discharge openings 60 is reduced substantially by the three partition walls and the bottom surface, although these chambers 42 are surrounded on four sides by the partition walls.

In the present embodiment, each inter-chamber communication passage 50 is formed in a cutout shape by cutting out a part of the upper portion of the partition wall separating the chambers 42. Forming the inter-chamber communication passages 50 in this manner can simplify the process of forming the inter-chamber communication passages 50 having a desired opening width, and can reduce the manufacturing cost of the cooling medium distributing member 4. Specifically, as shown in FIG. 1, in each inter-chamber communication passage 50, the upper surface of the cut-out part of the partition wall serves as a bottom surface portion, and two opposing side surfaces of the partition wall serves as side surface portions, and each inter-chamber communication passage 50 is a space formed by these three portions (the bottom surface portion and the two side surface portions). Thus, the opening width of each inter-chamber communication passage 50 is represented by a distance between the two side surface portions. Note that in this example, the directions normal to the two side surface portions match each other, and are perpendicular to the direction normal to the bottom surface portion. Thus, the opening width of each inter-chamber communication passage 50 is constant at any position in the up-down direction in the inter-chamber communication passage 50.

As shown in FIGS. 1 and 2, the cooling medium distributing member 4 is positioned so as to cover at least the uppermost part of the coil end portion 3, and the cooling medium distributing chamber 70, which is located in the uppermost part in the cooling medium distributing member 4 in the state in which the stator 1 is used, serves as a cooling medium introducing chamber 43 into which the cooling medium is introduced from the outside of the cooling medium distributing member 4. That is, the cooling medium introducing chamber 43 is positioned above the uppermost part of the coil end portion 3, so that the cooling medium is easily supplied from the uppermost part of the coil end portion 3 to both sides in the circumferential direction. Moreover, the cooling medium distributing path is formed so that the cooling medium introducing chamber 43 located in the uppermost part in the cooling medium distributing member 4 serves as a most upstream portion, and each of the plurality of cooling medium discharge chambers 80 serves as a most downstream portion. Thus, the cooling medium distributing path from the cooling medium introducing chamber 43 toward each cooling medium discharge chamber 80 can be formed so as not to have a portion that guides the cooling medium to flow upward. Accordingly, it becomes easy to flow the cooling medium down along the cooling medium distributing path by using the gravity, even if a pump or the like is not provided. Note that the cooling medium distributing path is formed so as not to merge after being divided by the cooling medium distributing chambers 70 described below.

Figure 3:
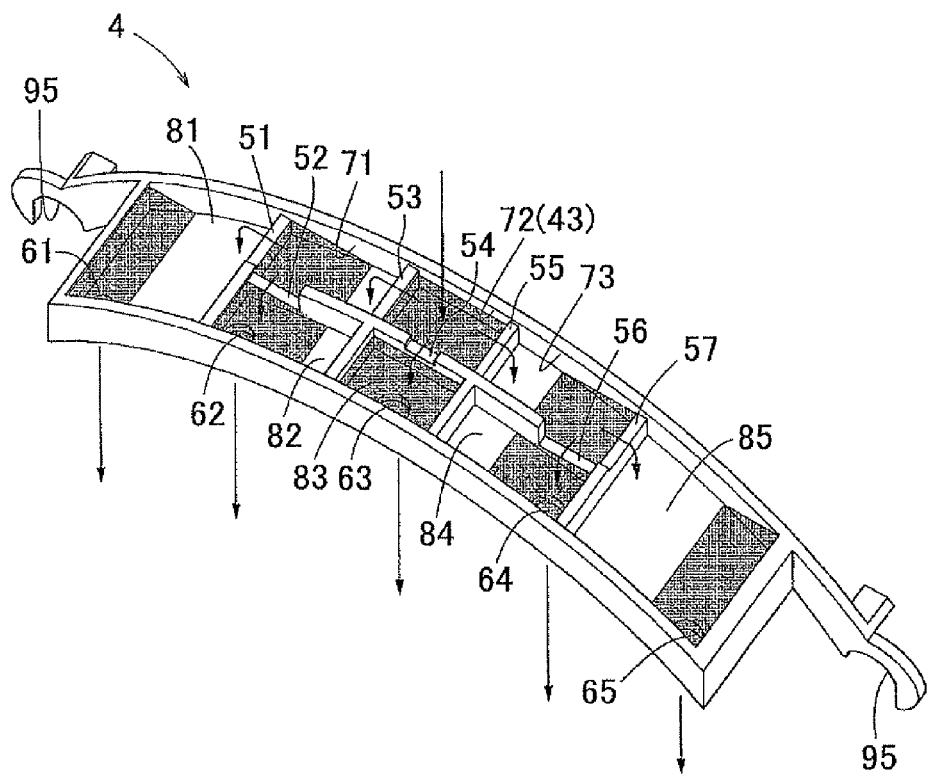
FIG. 3 is a perspective view of a cooling medium distributing member according to the embodiment of the present invention.

The cooling medium introduced into each cooling medium distributing chamber 70 is distributed to the plurality of inter-chamber communication passages 50, which are formed in the partition walls surrounding that cooling medium distributing chamber 70 and respectively communicate with the different chambers 42 located on the downstream side (see arrows in FIG. 3). At this time, it is desirable to be able to distribute the cooling medium to the plurality of inter-chamber communication passages 50 at the desired distribution ratio, regardless of the amount of cooling medium that is introduced into the cooling medium distributing chamber 70. Thus, the plurality of inter-chamber communication passages 50, which are formed in the partition walls surrounding one cooling medium distributing chamber 70 and respectively communicate with different chambers 42 located on the downstream side, are formed so that their bottom surfaces are located at the same level in the state in which the stator 1 is used. Thus, the cooling medium introduced into each cooling medium distributing chamber 70 is distributed to the plurality of chambers 42 located on the downstream side, at a distribution ratio that is determined according to the opening widths of the plurality of inter-chamber communication passages 50 that communicate with the plurality of chambers 42 located on the downstream side. Then, the cooling medium is eventually distributed to each of the plurality of cooling medium discharge chambers 80 having the cooling medium discharge openings 60 formed therein, at a distribution ratio according to the opening widths of all of the inter-chamber communication passages 50 which are located on the upstream side of each cooling medium discharge chamber 80. Thus, by appropriately setting the opening width of each inter-chamber communication passage 50, the cooling medium can be distributed to the plurality of cooling medium discharge openings 60 at the desired distribution ratio, regardless of the amount of cooling medium that is supplied to the cooling medium distributing chambers 70. Note that setting of the opening widths of the inter-chamber communication passages 50 will be described later.

Regarding each of the cooling medium discharging chambers 70 other than the cooling member introducing chamber 43, the bottom surface portion of the inter-chamber communication passage 50 that is formed in the partition wall surrounding the cooling medium discharge member 70 and communicates with the chamber 42 located on the upstream side (in this example, the cooling medium distributing chamber 70) is located at a level higher than that of the bottom surface portion of the inter-chamber communication passage 50 that communicates with the chamber 42 located on the next downstream side. This prevents the cooling medium introduced into the cooling medium distributing chamber 70 from flowing backward into the chamber 42 located on the upstream side.

As schematically shown in FIG. 1, a fixed amount of cooling medium is always stored in the cooling medium distributing chambers 70 having no cooling medium discharge opening 60 formed therein. At this time, the liquid level is substantially the same as the level of the bottom surface portions of the inter-chamber communication passages 50 that communicate with the chambers 42 located on the downstream side. When the cooling medium is introduced into the cooling medium distributing chamber 70, the liquid level of the cooling medium in this cooling medium distributing chamber 70 rises, and the amount of cooling medium corresponding to the rise of the liquid level is distributed to the plurality of chambers 42 located on the downstream side. That is, the amount of cooling medium according to the amount of cooling medium newly introduced into the cooling medium distributing chamber 70 is distributed to the plurality of chambers 42 located on the downstream side. Then, the cooling medium that has reached each cooling medium discharge chamber 80 as the most downstream portion in the cooling medium distributing path is supplied to the coil end portion 3 via the cooling medium discharge opening 60 formed in the cooling medium discharge chamber 80. Note that FIGS. 1 and 2 schematically show the state in which the cooling medium supplied to each cooling medium discharge chamber 80 is temporarily stored therein.

As described above, the fixed amount of cooling medium is always stored in the cooling medium distributing chambers 70. This structure reduces scattering of the introduced cooling medium, as compared to the structure in which the bottom surface of the cooling medium introducing chamber 43 is exposed when introducing the cooling medium into the cooling medium introducing chamber 43 (in this example, the cooling medium distributing chamber 70 located in the uppermost part). Note that any structure that is capable of introducing the cooling medium into the cooling medium introducing chamber 43 can be used as the structure for introducing the cooling medium into the cooling medium introducing chamber 43. For example, the structure for introducing the cooling medium into the cooling medium introducing chamber 43 may be a structure in which the cooling medium is supplied to the cooling medium introducing chamber 43 by dropping the cooling medium from a discharge port that is provided above the cooling medium introducing chamber 43, or a structure in which the cooling medium is supplied to the cooling medium introducing chamber 43 by discharging the cooling medium in the axial direction from a discharge port that is placed at a different position in the axial direction from that of the cooling medium distributing chamber 43. Note that in the present embodiment, since the cooling medium distributing chamber 70 serving as the cooling medium introducing chamber 43 is formed in a vessel shape that opens upward as described above, the structure for supplying the cooling medium to the cooling medium introducing chamber 43 can be simplified in any case.

Figure 4:
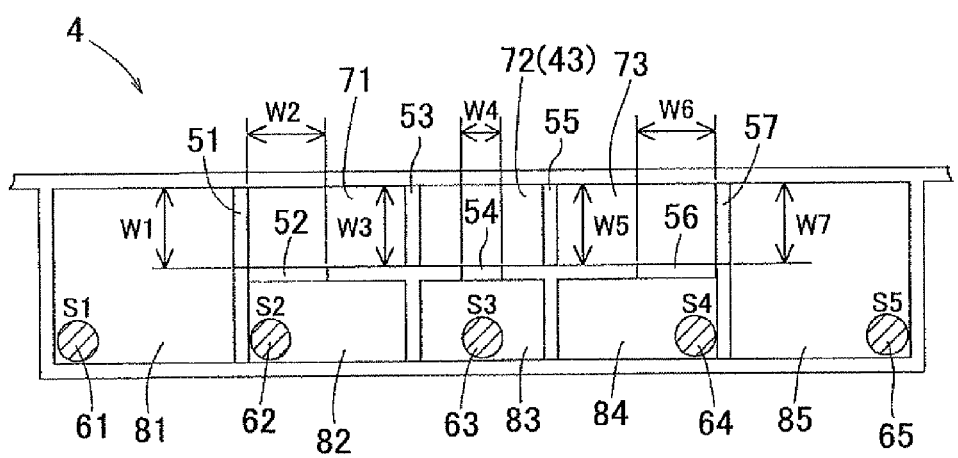
FIG. 4 is a diagram illustrating setting of the opening widths of inter-chamber communication passages that are formed in the cooling medium distributing member according to the embodiment of the present invention.

3. Method for Setting Opening Widths of Inter-Chamber Communication Passages A method for setting the opening widths of the inter-chamber communication passages 50 formed in the cooling medium distributing member 4 will be described in detail below with reference to FIGS. 3 and 4. Note that in the following description, as shown in FIGS. 3 and 4, the plurality of (three in this example) cooling medium distributing chambers 70 are distinctively referred to as a "first cooling medium distributing chamber 71," a "second cooling medium distributing chamber 72," and a "third cooling medium distributing chamber 73" sequentially from one side in the circumferential direction toward the other side in the circumferential direction. The plurality of (five in this example) cooling medium discharge chambers 80 are distinctively referred to as a "first cooling medium discharge chamber 81," a "second cooling medium discharge chamber 82," a "third cooling medium discharge chamber 83," a "fourth cooling medium discharge chamber 84," and a "fifth cooling medium discharge chamber 85" sequentially from the one side in the circumferential direction toward the other side in the circumferential direction. The plurality of (seven in this example) inter-chamber communication passages 50 are distinctively referred to as a "first inter-chamber communication passage 51," a "second inter-chamber communication passage 52," a "third inter-chamber communication passage 53," a "fourth inter-chamber communication passage 54," a "fifth inter-chamber communication passage 55," a "sixth inter-chamber communication passage 56," and a "seventh inter-chamber communication passage 57" sequentially from the one side in the circumferential direction toward the other side in the circumferential direction. The plurality of (five in this example) cooling medium discharge openings 60 are distinctively referred to as a "first cooling medium discharge opening 61," a "second cooling medium discharge opening 62," a "third cooling medium discharge opening 63," a "fourth cooling medium discharge opening 64," and a "fifth cooling medium discharge opening 65" sequentially from the one side in the circumferential direction toward the other side in the circumferential direction. Note that, in the case where these distinctions are not necessary, the "cooling medium distributing chambers 70," the "cooling medium discharge chambers 80," the "inter-chamber communication passages 50," and the "cooling medium discharge openings 60" are used similarly as above.

In the following description, as shown in FIG. 4, the opening cross-sectional areas of the first cooling medium discharge opening 61, the second cooling medium discharge opening 62, the third cooling medium discharge opening 63, the fourth cooling medium discharge opening 64, and the fifth cooling medium discharge opening 65 are represented by "S1," "S2," "S3," "S4," and "S5," respectively. The opening widths of the first inter-chamber communication passage 51, the second inter-chamber communication passage 52, the third inter-chamber communication passage 53, the fourth inter-chamber communication passage 54, the fifth inter-chamber communication passage 55, the sixth inter-chamber communication passage 56, and the seventh inter-chamber communication passage 57 are represented by "W1," "W2," "W3," "W4," "W5," "W6," and "W7," respectively.

In the present invention, the opening widths of the inter-chamber communication passages 50 are set as described below so that the amount of cooling medium according to the opening cross-sectional area of each cooling medium discharge opening 60 is supplied to each of the plurality of cooling medium discharge openings 60. That is, regarding the plurality of inter-chamber communication passages 50 that are formed in the partition walls surrounding one cooling medium distributing chamber 70 and communicate with the different chambers 42 located on the downstream side, the ratio of the opening width between the different inter-chamber communication passages 50 is set equal to the ratio, between the different inter-chamber communication passages 50, of the sum of the opening cross-sectional areas of all of the cooling medium discharge openings 60 which are located downstream of each inter-chamber communication passage 50. Note that the phrase "the sum of the opening cross-sectional areas of all of the cooling medium discharge openings 60 which are located downstream of each inter-chamber communication passage 50" is used as a concept including the opening cross-sectional area of the cooling medium discharge opening 60 in the case where there is only one cooling medium discharge opening 60 located downstream of each inter-chamber communication passage 50. The three cooling medium distributing chambers 71 to 73 will be individually described in detail below.

(a) First Cooling Medium Distributing Chamber 71

Regarding the plurality of inter-chamber communication passages 50 formed in the partition walls surrounding the first cooling medium distributing chamber 71 and communicating with the different chambers 42 located on the downstream side (the first inter-chamber communication passage 51 communicating with the first cooling medium discharge chamber 81, and the second inter-chamber communication passage 52 communicating with the second cooling medium discharge chamber 82), the opening widths are set as described below. That is, the ratio of the opening width W1 of the first inter-chamber communication passage 51 to the opening width W2 of the second inter-chamber communication passage 52 is set equal to the ratio of the sum (S1) of the opening cross-sectional areas S of all of the cooling medium discharge openings 60 (the first cooling medium discharge opening 61) which are located downstream of the first inter-chamber communication passage 51, to the sum (S2) of the opening cross-sectional areas S of all of the cooling medium discharge openings 60 (the second cooling medium discharge opening 62) which are located downstream of the second inter-chamber communication passage 52. This is represented by the following expression (1).

$$W1:W2=S1:S2 \qquad (1)$$

Note that in this example, W1:W2=1:1 as the opening cross-sectional areas S1 to S5 of the cooling medium discharge openings 61 to 65 are equal to each other.

(b) Third Cooling Medium Discharging Chamber 73

Regarding the plurality of inter-chamber communication passages 50 formed in the partition walls surrounding the third cooling medium distributing chamber 73 and communicating with the different chambers 42 located on the downstream side (the sixth inter-chamber communication passage 56 communicating with the fourth cooling medium discharge chamber 84, and the seventh inter-chamber communication passage 57 communicating with the fifth cooling medium discharge chamber 85), the opening widths are set as described below. That is, the ratio of the opening width W6 of the sixth inter-chamber communication passage 56 to the opening width W7 of the seventh inter-chamber communication passage 57 is set equal to the ratio of the sum (S4) of the opening cross-sectional areas S of all of the cooling medium discharge openings 60 (the fourth cooling medium discharge opening 64) which are located downstream of the sixth inter-chamber communication passage 56, to the sum (S5) of the opening cross-sectional areas S of all of the cooling medium discharge openings 60 (the fifth cooling medium discharge opening 65) which are located downstream of the seventh inter-chamber communication passage 57. This is represented by the following expression (2).

$$W6:W7=S4:S5 \qquad (2)$$

Note that in this example, W6:W7=1:1 as the opening cross-sectional areas S1 to S5 of the cooling medium discharge openings 61 to 65 are equal to each other.

(c) Second Cooling Medium Discharging Chamber 72

Regarding the plurality of inter-chamber communication passages 50 formed in the partition walls surrounding the second cooling medium distributing chamber 72 and communicating with the different chambers 42 located on the downstream side (the third inter-chamber communication passage 53 communicating with the first cooling medium distributing chamber 71, the fourth inter-chamber communication passage 54 communicating with the third cooling medium discharge chamber 83, and the fifth inter-chamber communication passage 55 communicating with the third cooling medium distributing chamber 73), the opening widths are set as described below. That is, the ratio among the opening width W3 of the third inter-chamber communication passage 53, the opening width W4 of the fourth inter-chamber communication passage 54, and the opening width W5 of the fifth inter-chamber communication passage 55 is set equal to the ratio among the sum (S1+S2) of the opening cross-sectional areas S of all of the cooling medium discharge openings 60 (the first cooling medium discharge opening 61 and the second cooling medium discharge opening 62) which are located downstream of the third inter-chamber communication passage 53, the sum (S3) of the opening cross-sectional areas S of all of the cooling medium discharge openings 60 (the third cooling medium discharge opening 63) which are located downstream of the fourth inter-chamber communication passage 54, and the sum (S4+S5) of the opening cross-sectional areas S of all of the cooling medium discharge openings 60 (the fourth cooling medium discharge opening 64 and the fifth cooling medium discharge opening 65) which are located downstream of the fifth inter-chamber communication passage 55. This is represented by the following expression (3).

$$W3:W4:W5=(S1+S2):S3:(S4+S5) \qquad (3)$$

Note that in this example, W3:W4:W5=2:1:2 as the opening cross-sectional areas S1 to S5 of the cooling medium discharge openings 61 to 65 are equal to each other.

By setting the opening widths W1 to W7 of the inter-chamber communication passages 51 to 57 as described above, the amount of cooling medium according to the opening cross-sectional area of each cooling medium discharge opening 60 can be supplied to each of the plurality of cooling medium discharge openings 60, regardless of the amount of cooling medium supplied to each cooling medium distributing chamber 70. In other words, the cooling medium can be distributed to each of the plurality of cooling medium discharge openings 60, according to the amount of cooling medium that can be discharged by each cooling medium discharge opening 60. Thus, the coil end portion 3 can be cooled efficiently. Note that in this example, the ratio of the discharge amount of the cooling medium between the different cooling medium discharge openings 60 is substantially equal to the ratio of the opening cross-sectional area between the different cooling medium discharge openings 60. In this example, as can be seen from FIG. 4, the opening width W1 of the first inter-chamber communication passage 51, the opening width W3 of the third inter-chamber communication passage 53, the opening width W5 of the fifth inter-chamber communication passage 55, and the opening width W7 of the seventh inter-chamber communication passage 57 are equal to each other.

Figure 5:
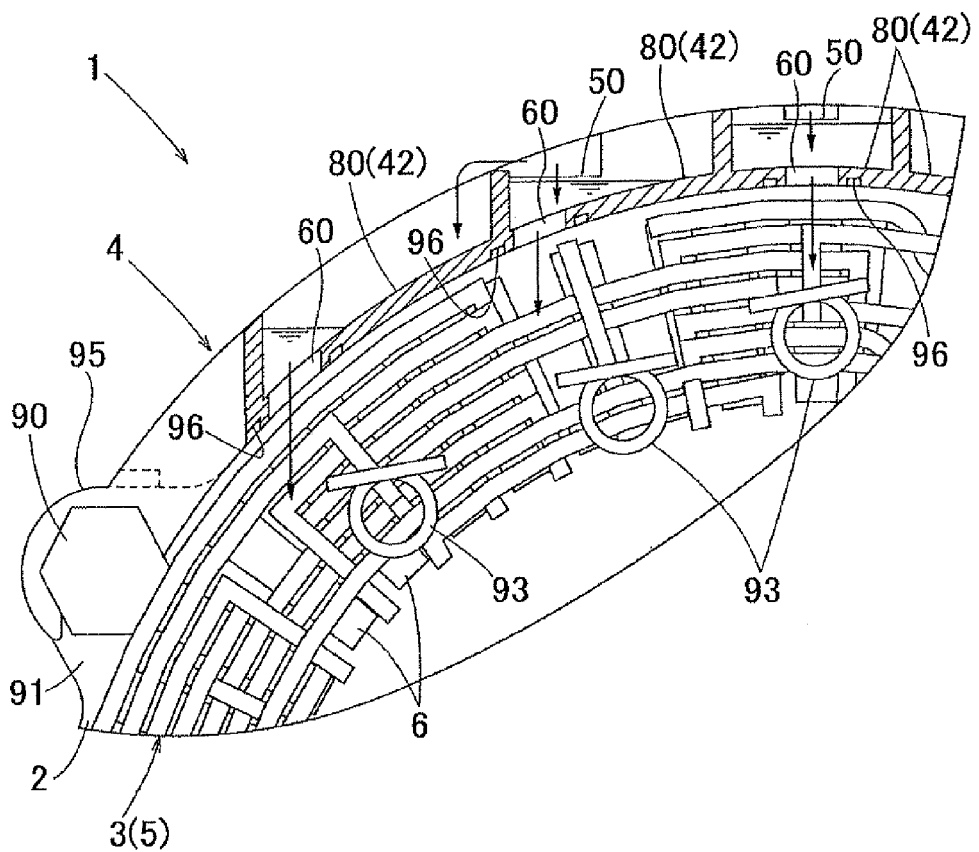
FIG. 5 is a diagram showing a part of a stator according to other embodiment of the present invention as viewed from one side in the axial direction.
Figure 6:
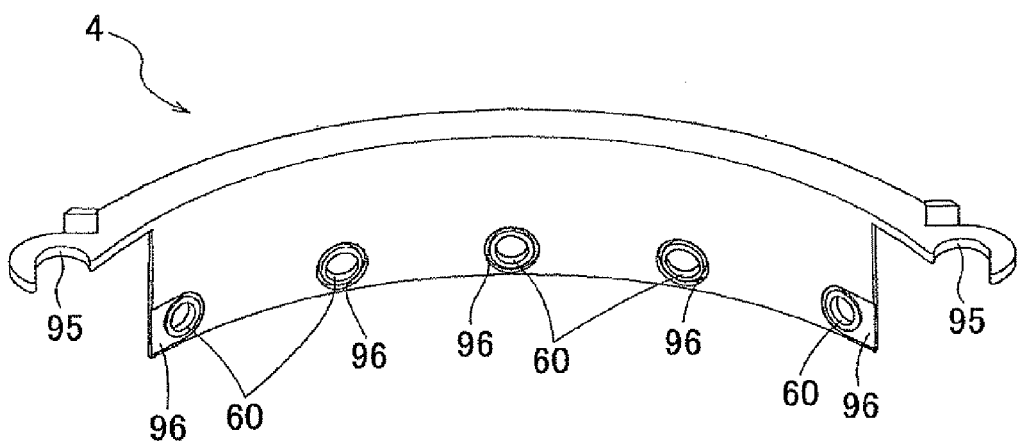
FIG. 6 is a perspective view of a cooling medium distributing member according to the other embodiment of the present invention.

4. Other Embodiments (1) The above embodiment is described with respect to an example in which the regions adjacent to the cooling medium discharge openings 60 in the lower surface of the cooling medium distributing member 4 have a smooth, circular-arc shaped surface. However, embodiments of the present invention are not limited to this. For example, as shown in FIGS. 5 and 6, it is also one of preferred embodiments of the present invention that a groove-like recessed portion 96 be formed around the opening portion of each cooling medium discharge opening 60 in the lower surface of the cooling medium distributing member 4. This structure can reduce the possibility that the cooling medium discharged downward from the cooling medium discharge openings 60 may flow along the lower surface of the cooling medium distributing member 4. Thus, the cooling medium that is discharged from the cooling medium discharge openings 60 can be more reliably supplied to the region of the coil end portion 3 which is located below the cooling medium discharge opening 6 and to which the cooling medium is to be supplied, whereby the coil end portion 3 can be cooled appropriately. Note that providing such groove-like recessed portions 96 does not increase the size of the cooling medium distributing member 4 in the up/down direction, and thus causes no significant problem regarding the positioning of the cooling medium distributing member 4.

Figure 7:
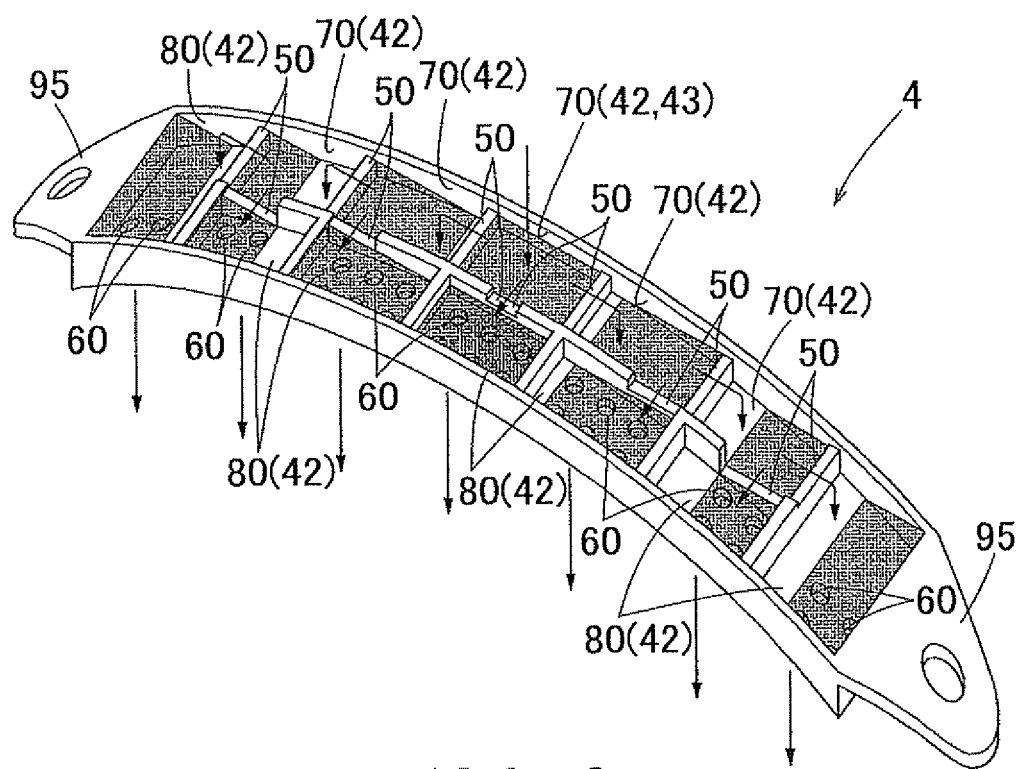
FIG. 7 is a perspective view of a cooling medium distributing member according to still other embodiment of the present invention.

(2) The above embodiment is described with respect to an example in which the cooling medium distributing member 4 includes three cooling medium distributing chambers 70 and five cooling medium discharge chambers 80, and one cooling medium discharge opening 60 is formed in each cooling medium discharge chamber 80. However, embodiments of the present invention are not limited to this, and the number of cooling medium distributing chambers 70 and the number of cooling medium discharge chambers 80, which are provided in the cooling medium distributing member 4, and the number of cooling medium discharge openings 60 that are formed in each cooling medium discharge chamber 80 may be changed as appropriate. For example, as shown in FIG. 7, the cooling medium distributing member 4 may be structured to include five cooling medium distributing chambers 70 and seven cooling medium discharge chambers 80. In the example of FIG. 7, the number of cooling medium discharge openings 60 that are formed in the cooling medium discharge chamber 80 varies among the cooling medium discharge chambers 80. Specifically, six cooling medium discharge openings 60 are formed in each of the three cooling medium discharge chambers 80 located in the middle in the circumferential direction, and four cooling medium discharge openings 60 are formed in each of the remaining four cooling medium discharge chambers 80. Even in the structure in which a plurality of cooling medium discharge openings 60 are formed in each cooling medium discharge chamber 80, functions and effects similar to those of the above embodiment can be obtained by setting the opening width of each inter-chamber communication passage 50 as in the above embodiment. The positions where the plurality of cooling medium discharge openings 60 are formed in each cooling medium discharge chamber 80 may be displaced in the circumferential direction so that these cooling medium discharge openings 60 are located at different positions in the up/down direction. The ratio of the discharge amount of the cooling medium among these cooling medium discharge openings 60 can be adjusted in this manner. Note that unlike the above embodiment, the cooling medium distributing member 4 shown in FIG. 7 is structured to be fixed to the case via the attachment portions 95 by fastening bolts other than the fastening bolts 90 that fix the stator core 2 to the case.

(3) The above embodiment is described with respect to an example in which the plurality of cooling medium discharge openings 60 formed in the cooling medium distributing member 4 have the same opening cross-sectional area. However, embodiments of the present invention are not limited to this, and it is also one of preferred embodiments of the present invention that the plurality of cooling medium discharge openings 60 have different opening cross-sectional areas from each other. As such a structure, for example, it is preferable that each of the opening cross-sectional areas of the plurality of cooling medium discharge openings 60 be set according to the amount of heat that is generated in a corresponding region of the coil end portion 3 to which the cooling medium is to be supplied. With this structure, a larger amount of cooling medium can be supplied to a hotter region of the coil end portion 3, whereby cooling efficiency of the coil end portion 3 can be increased.

(4) The above embodiment is described with respect to an example in which regarding the plurality of inter-chamber communication passages 50 that are formed in the partition walls surrounding one cooling medium distributing chamber 70 and communicate with the different chambers 42 located on the downstream side, the ratio of the opening width between the different inter-chamber communication passages 50 is set equal to the ratio, between the different inter-chamber communication passages 50, of the sum of the opening cross-sectional areas of all of the cooling medium discharge openings 60 which are located downstream of each inter-chamber communication passage 50. However, embodiments of the present invention are not limited to this, and it is also one of preferred embodiments of the present invention that regarding the plurality of inter-chamber communication passages 50 that are formed in the partition walls surrounding one cooling medium distributing chamber 70 and communicate with the different chambers 42 located on the downstream side, the ratio of the opening width between the different inter-chamber communication passages 50 be set according to the ratio, between the different inter-chamber communication passages 50, of the sum of the opening cross-sectional areas of all of the cooling medium discharge openings 60 which are located downstream of each inter-chamber communication passage 50. In such a structure, for example, by adjusting the opening widths based on the opening widths of the inter-chamber communication passages 50 that are determined as in the above embodiment, the amount of cooling medium that is distributed to each cooling medium discharge opening 60 can be adjusted according to the temperature of a corresponding region of the coil end portion 3 to which the cooling medium is to be supplied, or can be adjusted according to the distance to the corresponding region of the coil end portion 3 to which the cooling medium is to be supplied.

(5) The above embodiment is described with respect to an example in which the stator 1 is placed in the case so that the central axis of the stator 1 extends in the horizontal direction. However, embodiments of the present invention are not limited to this. For example, it is also one of preferred embodiments of the present invention that the stator 1 be placed so that the central axis of the stator 1 extends in a direction crossing the vertical direction (this direction will be referred to as the "cross direction" in this paragraph) except for the horizontal direction, and the coil end portion 3 be formed in a cylindrical shape extending in the cross direction. For example, in the case where the stator 1 is a stator for a rotating electrical machine as a driving force source of a vehicle such as a hybrid vehicle or an electric vehicle, the cross direction may be a direction that extends in the longitudinal direction of the vehicle and extends downward in the vertical direction toward the rear side of the vehicle. In such a structure, it is preferable that the positional relation between the cooling medium distributing chamber 70 and the cooling medium discharge chamber 80 which are located adjacent to each other in the axial direction be determined so that the cooling medium distributing chamber 70 is located above the cooling medium discharge chamber 80.

Figure 8:
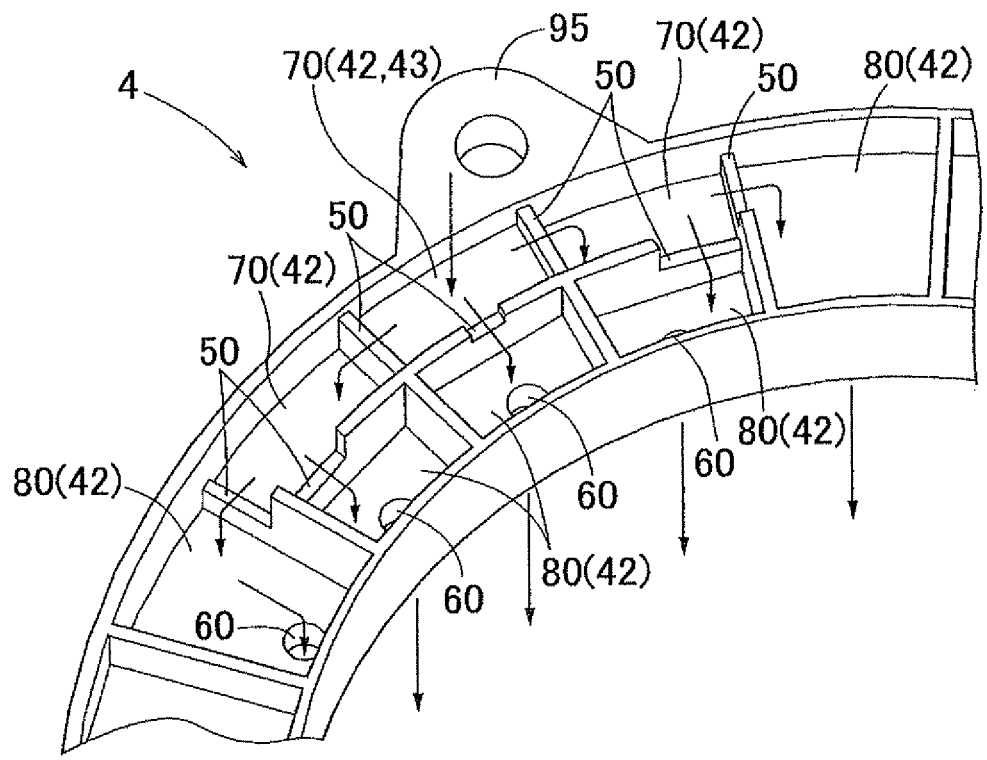
FIG. 8 is a perspective view of a cooling medium distributing member according to a further embodiment of the present invention.
Figure 9:
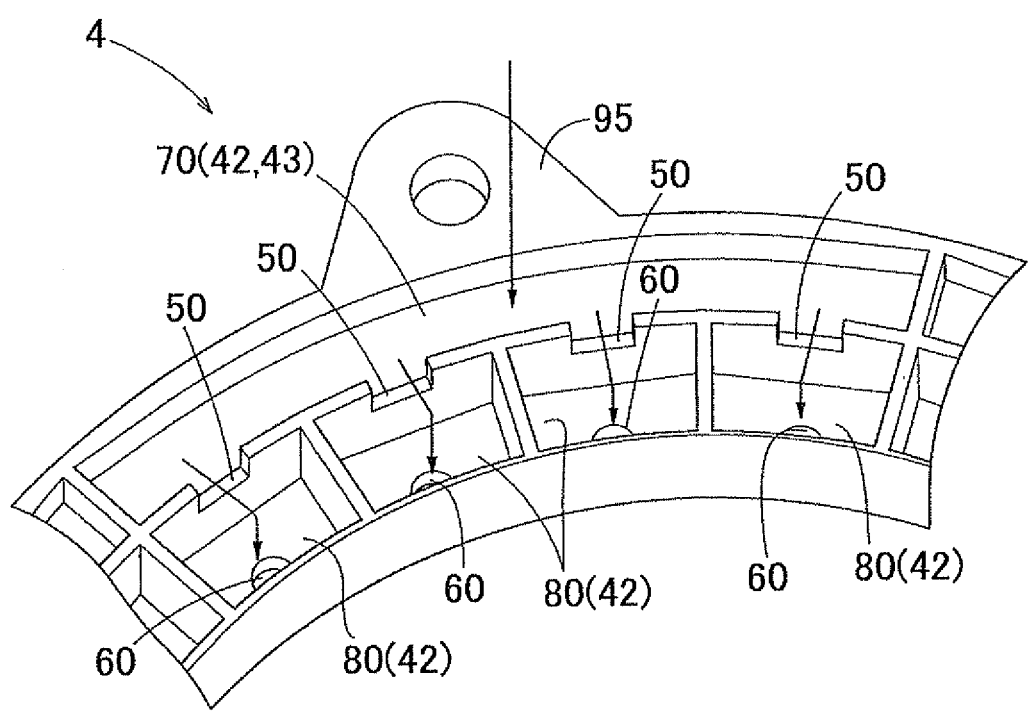
FIG. 9 is a perspective view of a cooling medium distributing member according to a still further embodiment of the present invention.

(6) The above embodiment is described with respect to an example in which the stator 1 is placed in the case so that the central axis of the stator 1 extends in a direction (the horizontal direction) that crosses the vertical direction. However, embodiments of the present invention are not limited to this, and it is also one of preferred embodiments of the present invention that the stator 1 be placed in the case so that the central axis of the stator 1 extends in the vertical direction. In such a structure, for example, the cooling medium distributing member 4 as shown in FIG. 8 or 9 may be positioned above (axially outside) the coil end portion. Note that FIGS. 8 and 9 are diagrams showing only a part of the cooling medium distributing member 4. Even in the cooling medium distributing member 4 formed in this manner, functions and effects similar to those of the above embodiment can be obtained by setting the level of the bottom surface portion of each inter-chamber communication passage 50 and the opening width of each inter-chamber communication passage 50 as in the above embodiment. Note that in the example of FIG. 8, three cooling medium distributing chambers 70 are arranged side by side along the circumferential direction to form the cooling medium distributing chamber portion, and three cooling medium discharge chambers 80 located in the middle in the circumferential direction are arranged side by side in the circumferential direction to form the cooling medium discharge chamber portion. The cooling medium distributing chamber portion and the cooling medium discharge chamber portion are arranged side by side in the radial direction. In the example shown in FIG. 9, four cooling medium discharge chambers 80 are provided radially inside every cooling medium distributing chamber 70, and are arranged side by side in the circumferential direction. Note that FIGS. 8 and 9 show examples in which the cooling medium distributing member 4 be formed in a cylindrical shape as viewed in the vertical direction. However, it should be understood that the cooling medium distributing member 4 may be formed in a circular arc shape as viewed in the vertical direction.

(7) The above embodiment is described with respect to an example in which the opening width of each inter-chamber communication passage 50 is constant at any position in the up/down direction in the inter-chamber communication passage 50. However, embodiments of the present invention are not limited to this, and it is also one of preferred embodiments of the present invention that the opening width of each inter-chamber communication passage 50 vary depending on the position in the up-down direction in the inter-chamber communication passage 50. In such a structure as well, functions and effects similar to those of the above embodiment can be obtained by setting the ratio of the opening width between the different inter-chamber communication passages 50 be set in the manner described in the above embodiment at any position in the up-down direction. In such a structure, for example, each inter-chamber communication passage 50 may be formed so that the opening width thereof uniformly increases toward an upper end. In this case, if the amount of cooling medium that is supplied to the cooling medium distributing chamber 70 is increased, the amount of cooling medium that is supplied to the plurality of chambers 42 located on the downstream side can be increased as compared to the above embodiment, while maintaining the desired distribution ratio of the cooling medium that is distributed to these chambers 42. Thus, the possibility that the cooling medium may overflow the cooling medium distributing chamber 70 can be reduced.

(8) The above embodiment is described with respect to an example in which each inter-chamber communication passage 50 that communicate between adjacent chambers 42 is formed by one communication passage. However, embodiments of the present invention are not limited to this, and it is also one of preferred embodiments of the present invention that each inter-chamber communication passage 50 that communicate between adjacent chambers 42 be formed by two or more (e.g., two, three, or the like) communication passages. In this structure, functions and effects similar to those of the above embodiment can be obtained by setting the width of each inter-chamber communication passage 50 by regarding the sum of the opening widths of the communication passages that communicate between the same two chambers 42, as the width of the inter-chamber communication passage 50 that communicates between these two chambers 42.

(9) The above embodiment is described with respect to an example in which the cooling medium introducing chamber 43 is the cooling medium distributing chamber 70 located in the uppermost part in the cooling chamber distributing member 4. However, embodiments of the present invention are not limited to this, and it is also one of preferred embodiments of the present invention that other cooling medium distributing chamber 70 in the cooling medium distributing member 4 be formed as the cooling medium introducing chamber 43. That is, the number of cooling medium introducing chambers 43 is not limited to one, and a plurality of (e.g., two, three, or the like) cooling medium introducing chambers 43 may be formed in the cooling medium distributing member 4. In this case, cooling medium distributing paths starting from the cooling medium introducing chambers 43 need to be independent of each other.

(10) The above embodiment is described with respect to an example in which the plurality of chambers 42 are formed in a vessel shape that opens upward, and each inter-chamber communication passage 50 is formed in a cutout shape by cutting out a part of the upper part of the partition wall. However, embodiments of the present invention are not limited to this. For example, it is also one of preferred embodiments of the present invention that at least a part of the plurality of chambers 42 (e.g., the chambers 42 other than the cooling medium introducing chamber 43) include a wall portion that forms a ceiling. It is also one of preferred embodiments of the present invention that each inter-chamber communication passage 50 be formed so as to extend through the partition wall. In this case, the cross-sectional shape of the through hole may be, e.g., a rectangular shape, an elliptical shape, or a circular shape.

(11) The above embodiment is described with respect to an example in which the cooling medium distributing member 4 be formed in a circular arc shape as viewed in the axial direction of the coil end portion 3. However, embodiments of the present invention are not limited to this, and the shape of the cooling medium distributing member 4 as viewed in the axial direction of the coil end portion 3 may be changed as appropriate according to the shape of the outer peripheral surface of the coil end portion 3. Alternatively, the shape of the cooling medium distributing member 4 as viewed in the axial direction of the coil end portion 3 may be a shape unrelated to that of the outer peripheral surface of the coil end portion 3. For example, the shape of the cooling medium distributing member 4 as viewed in the axial direction of the coil end portion 3 may be a linear shape or a bent line shape.

(12) The above embodiment is described with respect to an example in which the cooling medium distributing member 4 has the cooling medium distributing chamber portion in which the plurality of cooling medium distributing chambers 70 are arranged adjacent to each other along the circumferential direction of the coil end portion 3, and the cooling medium discharge chamber portion in which the plurality of cooling medium discharge chambers 80 are arranged adjacent to each other along the circumferential direction of the coil end portion 3. The cooling medium distributing member 4 has a portion in which the cooling medium distributing chamber portion and the cooling medium discharge chamber portion are arranged side by side in the axial direction of the coil end portion 3. However, embodiments of the present invention are not limited to this, and it is also one of preferred embodiments of the present invention that the cooling medium distributing member 4 do not have such a portion. That is, the positions where the cooling medium distributing chambers 70 and the cooling medium discharge chambers 80 are provided in the cooling medium distributing member 4 may be changed as appropriate.

(13) The above embodiment is described with respect to an example in which the cooling medium distributing member 4 is formed so as to cover at least the uppermost part of the coil end portion 3. However, embodiments of the present invention are not limited to this, and it is also one of preferred embodiments of the present invention that the cooling medium distributing member 4 be structured so as not to cover the uppermost part of the coil end portion 3. Such a structure can be preferably implemented in the case where the cooling medium is supplied from a member different from the cooling medium distributing member 4 to the uppermost part of the coil end portion 3. In such a structure as well, it is preferable that the cooling medium introducing chamber 43 be the cooling medium distributing chamber 70 located in the uppermost part in the cooling medium distributing member 4.

(14) The above embodiment is described with respect to an example in which the coil end portion 3, to which the cooling medium is supplied from the cooling medium distributing member 4, has such a shape as shown in FIG. 1. However, embodiments of the present invention are not limited to this, and the present invention may be applied to coil end portions having any shape such as the shape of the coil end portion 94 shown in FIG. 2.

(15) The above embodiment is described with respect to an example in which the cooling medium distributing member 4 is provided above the coil end portion 3 located on the one side in the axial direction of the stator 1. However, embodiments of the present invention are not limited to this, and it is also one of preferred embodiments of the present invention that a similar cooling medium distributing member be provided also above the coil end portion 94 located on the other side in the axial direction of the stator 1, or that a similar cooling medium distributing member be provided only above the coil end portion 94 located on the other side in the axial direction of the stator 1.

(16) The above embodiment is described with respect to an example in which each cooling medium discharge opening 60 is formed at such a position that the entire opening portion thereof overlaps the coil end portion 3 as viewed in the vertical direction. However, embodiments of the present invention are not limited to this. Thus, it is also one of preferred embodiments of the present invention that each cooling medium discharge opening 60 be formed at such a position that a part of the opening portion thereof overlaps the coil end portion 3 as viewed in the vertical direction. Note that each cooling medium discharge opening 60 may be formed at such a position that the opening portion thereof does not overlap the coil end portion 3 as viewed in the vertical direction.

(17) The above embodiment is described with respect to an example in which the cooling medium discharge openings 60 are formed in the bottom surfaces of the cooling medium discharge chambers 80. However, embodiments of the present invention are not limited to this, and it is also one of preferred embodiments of the present invention that at least one of the plurality of cooling medium discharge openings 60 be formed in a side surface other than the partition wall between adjacent chambers 42 in the cooling medium discharge chamber 80.

(18) The above embodiment is described with respect to an example in which the cooling medium distributing path is formed so that each of the plurality of cooling medium discharge chambers 80 serves as the most downstream portion. However, embodiments of the present invention are not limited to this, and it is also one of preferred embodiments of the present invention that an additional chamber be formed on the downstream side of at least a part of the plurality of cooling medium discharge chambers 80.

(19) The above embodiment is described with respect to an example in which the cooling medium discharge openings 60 have a circular cross section. However, embodiments of the present invention are not limited to this, and it is also one of preferred embodiments of the present invention that the cooling medium discharge openings 60 have a cross-sectional shape other than the circular shape (e.g., a polygonal shape such as a rectangular shape or an elliptical shape).

(20) The above embodiment is described with respect to an example in which the cooling medium distributing member 4 is made of an insulating material. However, embodiments of the present invention are not limited to this, and the cooling medium distributing member 4 may be made of a material other than the insulating material, such as a metal.

The present invention can be preferably used for a cooling structure for a stator of a rotating electrical machine that supplies a cooling medium to a coil end portion of the stator including a stator core and the coil end portion protruding from an end in the axial direction of the stator core, so as to cool the coil end portion.

What is claimed is:

1. A cooling structure for a stator of a rotating electrical machine that supplies a cooling medium to a coil end portion of the stator including a stator core and the coil end portion protruding from an end in an axial direction of the stator core, so as to cool the coil end portion, the cooling structure comprising:

a cooling medium distributing member provided above a region of the coil end portion to which the cooling medium is to be supplied, the cooling medium distributing member being formed with a plurality of cooling medium discharge openings for supplying the cooling medium to the coil end portion, and a cooling medium distributing path for distributing the introduced cooling medium to the plurality of cooling medium discharge openings, wherein the cooling medium distributing path has a plurality of chambers separated by a partition wall, and an inter-chamber communication passage that is formed in the partition wall and communicates between the adjacent chambers, as the plurality of chambers, the cooling medium distributing member includes at least one cooling medium distributing chamber that divides the cooling medium distributing path by distributing the cooling medium introduced into the chamber to a plurality of the inter-chamber communication passages, and also includes a plurality of cooling medium discharge chambers having the cooling medium discharge openings formed therein, and the cooling medium distributing path is formed so as not to merge after being divided by the cooling medium distributing chamber, and regarding the plurality of inter-chamber communication passages that are formed in the partition wall surrounding the cooling medium distributing chamber and communicate with the different chambers located on a downstream side, bottom surface portions of the inter-chamber communication passages are located at the same level, and a ratio of an opening width between the different inter-chamber communication passages is set according to a ratio of a sum of opening cross-sectional areas of all of the cooling medium discharge openings which are located downstream of each of the inter-chamber communication passages.

2. The cooling structure for the stator according to claim 1, wherein the plurality of chambers are formed in a vessel shape that opens upward, and each of the inter-chamber communication passages is formed by cutting out a part of an upper portion of the partition wall.

3. The cooling structure for the stator according to claim 2, wherein the coil end portion is formed in a cylindrical shape so that a central axis extends in a direction that crosses a vertical direction, the cooling medium distributing member is formed in a circular arc shape as viewed in an axial direction of the coil end portion, and is placed along an outer peripheral surface of the coil end portion, and a cooling medium introducing chamber, which is the cooling medium distributing chamber and serves as a chamber into which the cooling medium is introduced from outside of the cooling medium distributing member, is located in an uppermost part in the cooling medium distributing member.

4. The cooling structure for the stator according to claim 3, wherein the cooling medium distributing member includes a plurality of the cooling medium distributing chambers, and has a portion in which a cooling medium distributing chamber portion and a cooling medium discharge chamber portion are arranged side by side in the axial direction of the coil end portion, the cooling medium distributing chamber portion being a portion in which the plurality of cooling medium distributing chambers are arranged adjacent to each other along a circumferential direction of the coil end portion, and the cooling medium discharge chamber portion being a portion in which the plurality of cooling medium discharge chambers are arranged adjacent to each other along the circumferential direction of the coil end portion.

5. The cooling structure for the stator according to claim 4, wherein the cooling medium distributing member is formed so as to cover at least an uppermost part of the coil end portion.

6. The cooling structure for the stator according to claim 5, wherein a groove-like recessed portion is formed around an opening portion of the cooling medium discharge opening in a lower surface of the cooling medium distributing member.

7. The cooling structure for the stator according to claim 6, wherein each of the opening cross-sectional areas of the plurality of the cooling medium discharge openings is set according to an amount of heat that is generated in a corresponding part of the region of the coil end portion to which the cooling medium is to be supplied.

8. The cooling structure for the stator according to claim 7, wherein regarding the plurality of the inter-chamber communication passages that are formed in the partition wall surrounding the one cooling medium distributing chamber and communicate with the different chambers located on the downstream side, the ratio of the opening width between the different inter-chamber communication passages is set equal to the ratio of the sum of the opening cross-sectional areas of all of the cooling medium discharge openings which are located downstream of each of the inter-chamber communication passages.

9. The cooling structure for the stator according to claim 1, wherein
the coil end portion is formed in a cylindrical shape so that a central axis extends in a direction that crosses a vertical direction,
the cooling medium distributing member is formed in a circular arc shape as viewed in an axial direction of the coil end portion, and is placed along an outer peripheral surface of the coil end portion, and
a cooling medium introducing chamber, which is the cooling medium distributing chamber and serves as a chamber into which the cooling medium is introduced from outside of the cooling medium distributing member, is located in an uppermost part in the cooling medium distributing member.

10. The cooling structure for the stator according to claim 9, wherein
the cooling medium distributing member includes a plurality of the cooling medium distributing chambers, and has a portion in which a cooling medium distributing chamber portion and a cooling medium discharge chamber portion are arranged side by side in the axial direction of the coil end portion, the cooling medium distributing chamber portion being a portion in which the plurality of cooling medium distributing chambers are arranged adjacent to each other along a circumferential direction of the coil end portion, and the cooling medium discharge chamber portion being a portion in which the plurality of cooling medium discharge chambers are arranged adjacent to each other along the circumferential direction of the coil end portion.

11. The cooling structure for the stator according to claim 10, wherein
the cooling medium distributing member is formed so as to cover at least an uppermost part of the coil end portion.

12. The cooling structure for the stator according to claim 11, wherein
a groove-like recessed portion is formed around an opening portion of the cooling medium discharge opening in a lower surface of the cooling medium distributing member.

13. The cooling structure for the stator according to claim 12, wherein
each of the opening cross-sectional areas of the plurality of the cooling medium discharge openings is set according to an amount of heat that is generated in a corresponding part of the region of the coil end portion to which the cooling medium is to be supplied.

14. The cooling structure for the stator according to claim 1, wherein
the cooling medium distributing member is formed so as to cover at least an uppermost part of the coil end portion.

15. The cooling structure for the stator according to claim 14, wherein
a groove-like recessed portion is formed around an opening portion of the cooling medium discharge opening in a lower surface of the cooling medium distributing member.

16. The cooling structure for the stator according to claim 15, wherein
each of the opening cross-sectional areas of the plurality of the cooling medium discharge openings is set according to an amount of heat that is generated in a corresponding part of the region of the coil end portion to which the cooling medium is to be supplied.

17. The cooling structure for the stator according to claim 1, wherein
a groove-like recessed portion is formed around an opening portion of the cooling medium discharge opening in a lower surface of the cooling medium distributing member.

18. The cooling structure for the stator according to claim 17, wherein
each of the opening cross-sectional areas of the plurality of the cooling medium discharge openings is set according to an amount of heat that is generated in a corresponding part of the region of the coil end portion to which the cooling medium is to be supplied.

19. The cooling structure for the stator according to claim 1, wherein
each of the opening cross-sectional areas of the plurality of the cooling medium discharge openings is set according to an amount of heat that is generated in a corresponding part of the region of the coil end portion to which the cooling medium is to be supplied.

20. The cooling structure for the stator according to claim 1, wherein
regarding the plurality of the inter-chamber communication passages that are formed in the partition wall surrounding the one cooling medium distributing chamber and communicate with the different chambers located on the downstream side, the ratio of the opening width between the different inter-chamber communication passages is set equal to the ratio of the sum of the opening cross-sectional areas of all of the cooling medium discharge openings which are located downstream of each of the inter-chamber communication passages.

* * * * *